June 8, 1954
A. R. HEMPE, JR
2,680,472
ADJUSTABLE SPRING MOUNT AND SHOCK ABSORBER
ASSEMBLY FOR TRACTOR SEATS OR THE LIKE
Filed Dec. 9, 1950
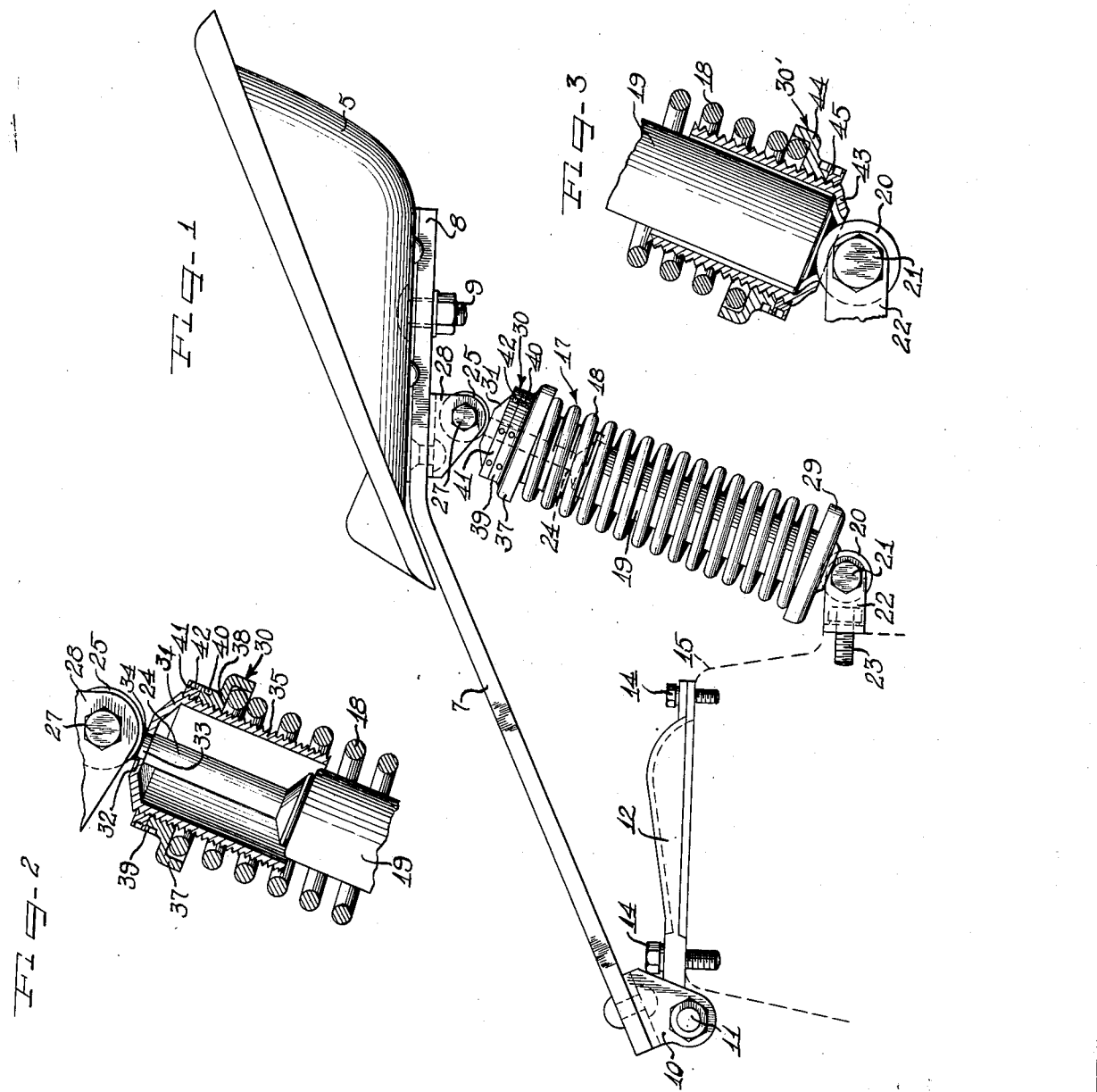
Inventor
Arthur R. Hempe Jr.
by Hill, Sherman, Meroni, Gross & Simpson
Attys Patented June 8, 1954

2,680,472

UNITED STATES PATENT OFFICE 2,680,472

ADJUSTABLE SPRING MOUNT AND SHOCK ABSORBER ASSEMBLY FOR TRACTOR SEATS OR THE LIKE

Arthur R. Hempe, Jr., Chicago, Ill., assignor to Houdaille-Hershey Corporation, Detroit, Mich., a corporation of Michigan Application December 9, 1950, Serial No. 200,062

10 Claims. (Cl. 155—9)

The present invention relates to improvements in the mounting of the bucket-type or like seats such as are used on tractors and like equipment, and more particularly concerns the provision of supporting spring and shock absorber assembly providing superior riding qualities for the seat.

An important object of the present invention is to provide an improved cushioning and shock absorber mount for a bucket-type seat such as may be used on tractor and other outdoor rolling equipment such as road machinery, agricultural machines or the like.

Another object of the invention is to provide a seat cushioning assembly of the kind utilizing a coiled compression spring and a direct-acting or telescopic shock absorber in combination and wherein adjustments can readily be effected for altering the characteristics of the ride for various weights of riders on the seat.

A further object of the invention is to provide improved means for adjusting the cushioning and shock absorbing qualities of a combination spring and shock absorber seat supporting structure.

Other objects, features and advantages of the present invention will be readily apparent from the following detailed description of certain preferred embodiments thereof taken in conjunction with the accompanying drawing, in which:

Figure 1 is a side elevational view of a bucket-type seat having a cushioning and shock absorbing mount embodying the features of the present invention;

Figure 2 is a fragmentary enlarged vertical sectional view, partially in side elevation, of the upper portion of the cushioning and shock absorbing mount of Fig. 1, showing various details of structure; and Figure 3 is a partially elevational and partially sectional fragmentary view of the lower portion of a slightly modified form of the cushioning and shock absorbing mount.

A bucket-type seat 5 of the type with which the present invention is concerned may comprise a pressed metal structure mounted upon a pivoted lever arm 7 which slants downwardly and forwardly and has an upper generally horizontal head portion 8 to which the seat 5 is secured as by means of one or more bolts 9. At its lower end portion the arm 7 has attached thereto in a suitable fashion a bracket 10 pivotally secured as by means of a bolt or pin 11 to an attachment plate or bracket 12 secured as by means of bolts 14 to the top of a portion of the vehicle with which the seat is associated, such as the top of a gear box or transmission housing 15. This mounting of the seat 5 enables the same to rock up and down in service.

Since vehicles of the type with which the seat 5 may be used, are usually operated over rough terrain, cushioning and shock absorbing means such as a unit 17 including a coiled compression spring 18 and a shock absorber 19 is provided between the underside of the seat and the underlying portion of the vehicle. The shock absorber 19 is of the direct acting or telescopic type including a cylinder housing a piston reciprocable in the cylinder in the presence of hydraulic fluid with a valving arrangement enabling slow relative reciprocal movements of the piston and cylinder but resisting or snubbing rapid or shock-imposed relative reciprocal movement. The general structure and operating characteristics of this type of shock absorber are well known and it is not therefore deemed necessary to enlarge herein upon the internal structural details of the shock absorber.

For mounting the shock absorber 19, its lower end is equipped with an eye knuckle member 20 which is secured as by means of a bolt 21 to a bracket 22 which may be secured as by means of a bolt or screw 23 to the rear of the gear casing 15.

At its upper end, the shock absorber 19 has a piston rod 24 projecting relatively reciprocably out of the top of the shock absorber casing and carrying at its upper end an eye knuckle 25 secured as by means of a pivot pin or bolt 27 within a bracket 28 which in turn is secured to the underside of the seat arm head 8. The construction and relationship are such that the shock absorber is installed on a downward and forward slant more or less conforming to the arc of movement of the seat 5 as it swings up and down in service.

The coiled compression spring 18 is of somewhat larger internal diameter than the external diameter of the shock absorber 19 and is mounted concentrically about the shock absorber in a manner to serve as a cushioning support for the seat 5. For this purpose, the lower end of the spring 18 is seated on a seating flange 29 preferably mounted on the lower shock absorber knuckle eye 20. At its upper end, the spring 18 is engaged by thrust cap or seating structure 30 carried by the upper end portion of the piston rod 24. Thereby, the weight of a person sitting in the seat 5 is thrust upon the spring 18 and as the vehicle with which the seat is associated moves over unevennesses in the path of the vehicle, the seat can move up and down due to the resilient yieldability of the spring 18. Over-rapid and sudden compressions of the spring 18 are resisted by action of the shock absorber 19. Rebound is snubbed by the shock absorber 19.

However, in order to attain highest efficiency in operation of the shock absorber 19, the projected or extended relationship of the piston rod 24 relative to the shock absorber casing, and thereby the position of the piston within the cylinder in service with a person sitting in the seat 5 should be predetermined as for example at a midway position so that there will be approximately equal compression and rebound movement permitted within the range of relative reciprocal movement of the cylinder and piston of the shock absorber. Since the weight of the person sitting in the seat 5 determines the dead weight compression of the spring 18, a weight of spring that will provide a mid point relationship of the cylinder and piston for a given dead weight, and thus a comfortable ride for a person of such weight, will be thrown out of balance when the seat is used by a person whose weight differs substantially from the mean or predetermined weight. When thus out of operative balance, the riding characteristics at one end of the operative range of the shock absorber 19 deteriorates in proportion as the user's weight deviates from the mean weight. For example, when a person heavier than the mean weight uses the seat 5, the compression portion of the operative range of the shock absorber 19 is shortened by the greater compression of the spring 18 and thereby the compression strokes of the piston within the shock absorber may terminate abruptly and jarringly or with a jolt under severe compression. On the other hand, when a person of substantially lighter weight than the mean weight for which the spring 18 is rated uses the seat, such extension of the piston rod 24 in service may prevail that the rebound portion of the operative range of the piston is shortened to such an extent that on severe rebound inadequate range is provided in the shock absorber and a jolting or jarring termination of the rebound stroke under severe conditions may occur.

According to the present invention means are provided for effecting adjustment in the relative overall length of the spring 18 and the shock absorber 19 so as to compensate for variations from a rated mean loading relationship of the spring and shock absorber. In a simple and efficient arrangement, the upper end thrust cap structure 30 of the assembly is constructed to enable the relative spring and shock absorber adjustment. Hence, the thrust structure comprises an elongated inverted cup-like member 31 having the base or web portion thereof centrally apertured as at 32 and engaged about a reduced diameter portion 33 at the upper extremity of the piston rod 24, the assembly of the piston rod, the knuckle eye 25 and the cap member 31 being secured rigidly as by means of welding 34.

The cap member 31 has an elongated cylindrical wall portion 35 which is internally of somewhat larger diameter than the external diameter of the shock absorber casing and is externally of somewhat smaller diameter than the internal diameter of the spring 18 so that the cylindrical diameter of wall portion 35 will in service fit freely and out of contact between the shock absorber casing and the spring. Externally the cylindrical wall or flange portion 35 is threaded and is threadedly engaged by an abutment annulus or flange 37 of angular cross section providing an abutment shoulder 38 against which the upper end of the spring 18 thrusts. By adjustably threading the thrust shoulder flange member 37 longitudinally of the cylinder 35, relative adjustment of the length of the spring 18 and the extended or operative condition of the shock absorber is attained. Thus, assuming that the spring 18 is rated for a normal dead weight of 150 lbs. in the seat 5, a mid way adjustment of the thrust shoulder flange 37 on the cylinder 35 will attain the proper balanced condition of the shock absorber under dead weight of 150 lbs. If a person substantially lighter than 150 lbs. is to use the seat 5, then the thrust shoulder flange 37 is turned up toward the upper end of the cylinder 35 because the spring 18 is compressed less under the dead load of the lighter person and thereby the piston rod 24 is retracted less from the unload protracted position thereof when the load of the lighter person is imposed on the assembly. On the contrary, when a person substantially heavier than the mean rated load of 150 lbs. is to use the seat 5, the thrust shoulder flange 37 is turned down on the cylinder 35 toward the lower end in proportion to the deviation in weight of the user of the seat, so as to compensate for the greater dead load compression of the spring 18 under the weight of the heavier person and thereby assure that the piston rod 24 will be retracted from a greater protracted distance to substantially the balanced condition desired of the piston within the cylinder of the shock absorber under the dead load of the heavier person.

To facilitate turning the shoulder member 37 threadedly on the cylinder 35, it may be provided with a hub 39 equipped with any desired wrench engagement means such as a series of radial sockets 40 to receive a spanner wrench.

Adjusted positions of the thrust flange member 37 are maintained by suitable means such as a lock nut 41 threaded onto the cylinder 35 for locking engagement with the upper end of the hub 39 and desirably equipped for engagement by the same wrench that is adapted to manipulate the shoulder flange member 37, such as a spanner wrench and for this purpose may be equipped with spanner wrench radial sockets 42.

Instead of having the relative spring lengthening adjustment means at the top of the cushioning and shock absorber unit 17, such adjustment means may be provided at the bottom of the unit, as shown in Fig. 3. For this purpose, the lower spring thrust or abutment member 29 as shown in Fig. 1, may be replaced by an adjustment structure 30' which operates substantially like the adjustment structure 30 described in connection with Figs. 1 and 2 but is adapted for the bottom of the unit instead of the top of the unit. To this end, the lower adjustment unit 30' comprises an externally threaded cylinder member 43 carried by the lower knuckle eye 20 of the shock absorber structure and freely encircling the lower end portion of the shock absorber casing and freely received within the lower end portion of the spring 18. Threaded on the cylinder member 43 is a thrust shoulder flange 44 of angular cross section against which the lower end of the spring seats. A lock nut 45 bears against the lower end of the hub portion of the thrust shoulder flange 44 to lock the latter in any desired adjusted position. For riders heavier than a predetermined mean weight, the shoulder flange 44 is turned toward the upper end of the cylinder 43, while for riders lighter than the predetermined mean weight, the flange member 44 is turned down toward the lower end of the flange 43 to compensate for the weight differentials and thereby attain a balanced relationship within the shock absorber 19 for any weight of rider within a substantial range of weights.

For the usual anticipated service requirements, the adjustment means for the cushioning-shock absorber unit may be provided merely at either the top of the unit or at the bottom of the unit. However it may be desired for certain purposes to provide both the top and the bottom of the unit with spring adjusting means and this can be readily done by supplying the top of the unit with an adjustment structure 30 as shown in Figs. 1 and 2 while the bottom of the unit is provided with the adjustment structure 30' of Fig. 3.

It will be understood that modifications and variations may be effected without departing from the scope of the novel concepts of the present invention.

I claim as my invention:

1. In combination in apparatus of the character described, a coiled compression spring, a direct acting shock absorber disposed concentrically and in spaced relation within the spring, means for connecting the lower end of the shock absorber to a supporting portion of a vehicle, means for connecting the upper end portion of the shock absorber to a seat to be supported in cushioned relatively movable relation above the spring and shock absorber, means carried by the lower end of the shock absorber providing a thrust abutment for the lower end of the spring, and means carried by the upper end of the shock absorber providing a thrust abutment for the upper end of the spring, one of said spring abutment means being adjustable along the shock absorber to vary the relative length of the spring and shock absorber to compensate for varying dead loads to be supported by the spring and shock absorber combination.

2. In combination in a bucket seat cushioning and shock absorber unit, a direct acting shock absorber including a cylindrical body portion and a piston rod projecting therefrom, a coiled compression spring encircling the shock absorber, means carried by the lower end of the shock absorber providing an abutment for the lower end of the spring, means carried by the upper end of the shock absorber providing an abutment for the upper end of the spring, one of said abutment means comprising an externally threaded cylinder disposed concentrically between the shock absorber and the interior of the spring, and a thrust flange annulus threaded on said cylinder and threadedly adjustable longitudinally thereof to vary the relative length of the spring and shock absorber for service conditions.

3. In combination in a bucket seat cushioning and shock absorber unit, a direct acting shock absorber including a cylindrical body portion and a piston rod projecting therefrom, a coiled compression spring encircling the shock absorber, means carried by the lower end of the shock absorber providing an abutment for the lower end of the spring, means carried by the upper end of the shock absorber providing an abutment for the upper end of the spring, one of said abutment means comprising an externally threaded cylinder disposed concentrically between the shock absorber and the interior of the spring, a thrust flange annulus threaded on said cylinder and threadedly adjustable longitudinally thereof to vary the relative length of the spring and shock absorber for service conditions, and a thrust nut threaded on said cylinder and cooperating with said flange annulus to lock the same in adjusted position on said cylinder.

4. In combination in a bucket seat shock absorber and spring unit, a coiled compression spring, a direct acting shock absorber comprising a cylindrical body and a piston rod projecting from the body and disposed within the spring, a connector at the lower end of the shock absorber body, a connector at the upper end of the piston rod, a thrust flange member carried by the lower connector and having the lower end of the spring bearing thereagainst, a thrust flange member carried by the upper end portion of the piston rod and having the upper end of the spring bearing thereagainst to normally maintain the piston rod in protracted condition relative to the shock absorber body, one of said flange members being longitudinally adjustable relative to the shock absorber in order to vary the unloaded protracted relation of the piston rod relative to the shock absorber body in the uncompressed condition of the spring.

5. In combination in a bucket seat shock absorber and spring unit, a coiled compression spring, a direct acting shock absorber comprising a cylindrical body and a piston rod projecting from the body and disposed within the spring, a connector at the lower end of the shock absorber body, a connector at the upper end of the piston rod, a thrust structure carried by the lower connector and having the lower end of the spring bearing thereagainst, a thrust structure carried by the upper end portion of the piston rod and having the upper end of the spring bearing thereagainst to normally maintain the piston rod in protracted condition relative to the shock absorber body, one of said thrust structures being longitudinally adjustable relative to the shock absorber in order to vary the unloaded protracted relation of the piston rod relative to the shock absorber body in the uncompressed condition of the spring, said adjustable thrust structure comprising a fixed threaded cylinder and a shouldered flange annulus threaded on said cylinder.

6. A shock absorber and spring unit as defined in claim 5 wherein the threaded cylinder is carried by the lower connector on the shock absorber.

7. A shock absorber and spring unit as defined in claim 5 wherein the cylinder member is secured fixedly to the upper end portion of the piston rod.

8. In combination in a vehicle seat installation, a seat, means supporting the seat for up and down movement, a combination spring and shock absorber unit supporting said seat in an elevated position but yieldable for cushioned up and down movement, said unit including a coiled cylindrical compression spring and a direct acting shock absorber disposed concentrically within said spring, said shock absorber including a cylindrical body member and a piston rod member projecting axially therefrom and reciprocable into protracted and retracted relation thereto, first means connecting one of said members to said seat, second means connecting the other of said members to a fixed support, and an abutment associated with each of said first and second means for maintaining said spring therebetween, one of said abutments being adjustable along the shock absorber to vary the unloaded protraction of the piston rod member from the cylindrical body member to compensate for persons of differing weights using the seat.

9. A vehicle seat installation as defined in claim 8, wherein the adjustable abutment is located at the end of the spring adjacent said seat.

10. A vehicle seat installation as defined in claim 8 wherein the adjustable abutment is located at the end of the spring adjacent said fixed support.

References Cited in the file of this patent

UNITED STATES PATENTS

| Number | Name | Date |
|---|---|---|
| 874,721 | Adams | Dec. 24, 1907 |
| 2,534,047 | McIntyre | Dec. 12, 1950 |
| 2,558,928 | Bryan | July 3, 1951 |

FOREIGN PATENTS

| Number | Country | Date |
|---|---|---|
| 164,532 | Germany | Dec. 15, 1904 |